(12) United States Patent
Taku

(10) Patent No.: US 6,386,769 B1
(45) Date of Patent: May 14, 2002

(54) APPARATUS HAVING DEVICE FOR OPENING AND CLOSING COVER OF FILM CARTRIDGE CHAMBER

(75) Inventor: Masakazu Taku, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/525,829

(22) Filed: Mar. 15, 2000

(30) Foreign Application Priority Data

Mar. 19, 1999 (JP) ............................................ 11-076947

(51) Int. Cl.[7] .............................. G03B 1/00; G03B 17/02
(52) U.S. Cl. ........................................ 396/411; 396/536
(58) Field of Search ................................. 396/536, 535, 396/538, 413, 411

(56) References Cited

U.S. PATENT DOCUMENTS 5,630,192 A * 5/1997 Kobayashi ................... 396/513
5,870,644 A * 2/1999 Naka et al. ................... 396/512
5,903,789 A * 5/1999 Zander et al. ............... 396/411
5,907,729 A * 5/1999 Hayakawa ................... 396/411
5,933,672 A * 8/1999 Huang ......................... 396/536
6,032,000 A * 2/2000 Tanaka et al. ............... 396/536

* cited by examiner

*Primary Examiner*—David M. Gray
(74) *Attorney, Agent, or Firm*—Robin, Blecker & Daley

(57) ABSTRACT

A camera arranged to automatically open and close the cover of a film cartridge chamber includes a gear member having a gear part arranged to rotate for feeding and rewinding a film by engaging a supply spool of a film cartridge, a revolving member arranged to engage the gear part and to be caused to revolve by the rotation of the gear member, an opening operation member provided for opening the cover of the film cartridge chamber, and a lock member arranged to lock the cover in a closed state or to unlock the cover. In the camera, the lock member moves from outside of a revolving travel locus of the revolving member to inside of the revolving travel locus of the revolving member in association with an operation of the opening operation member, and the lock member is driven by a revolving motion of the revolving member to unlock the cover.

8 Claims, 14 Drawing Sheets

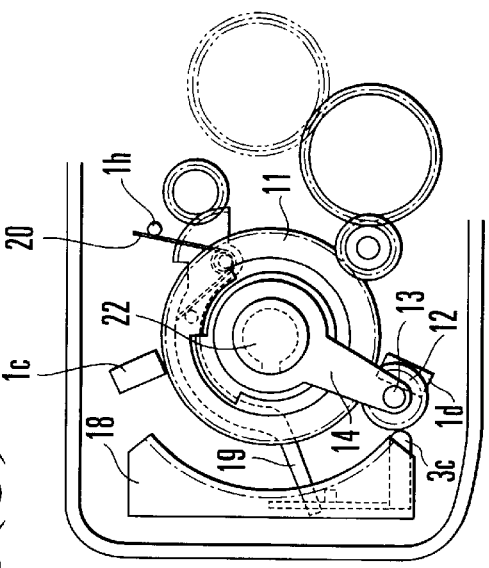
FIG.8(a) FIG.8(b)
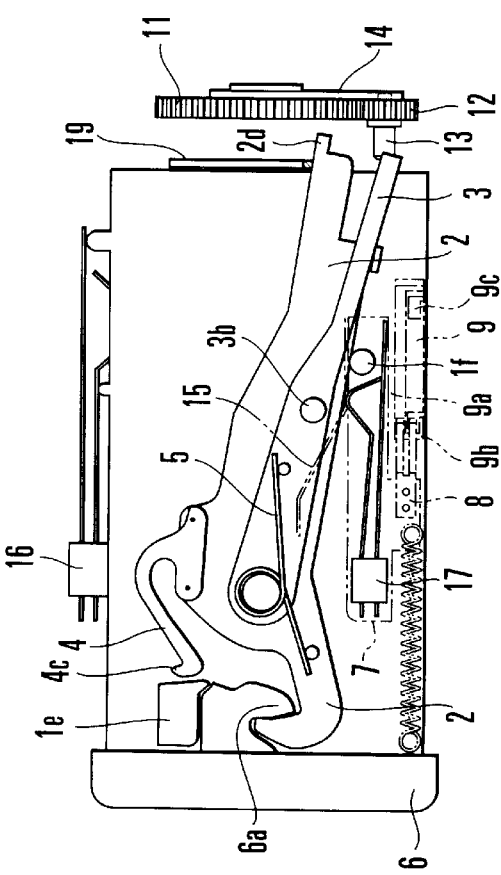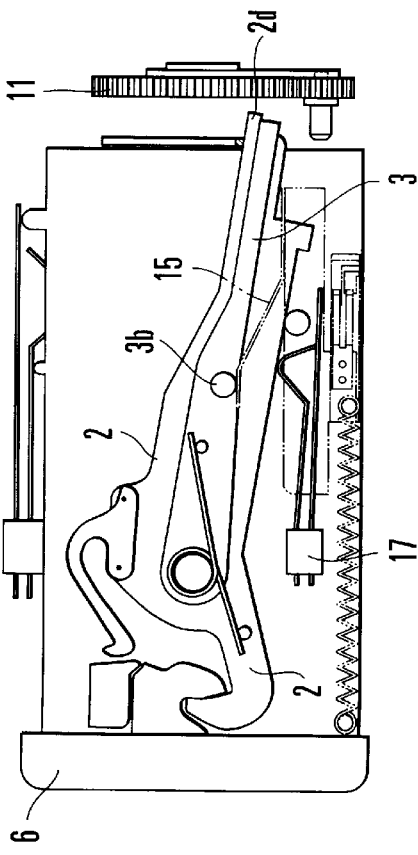
FIG.9(a) FIG.9(b)

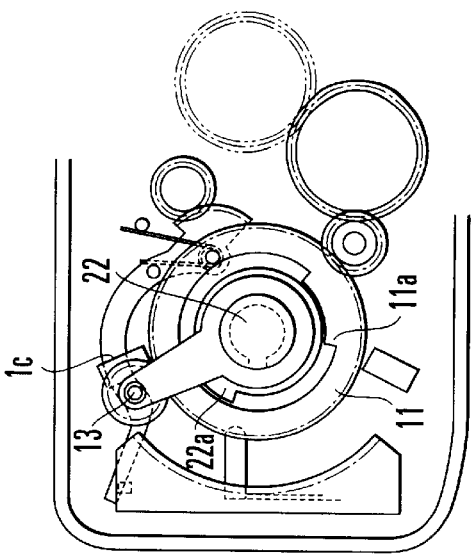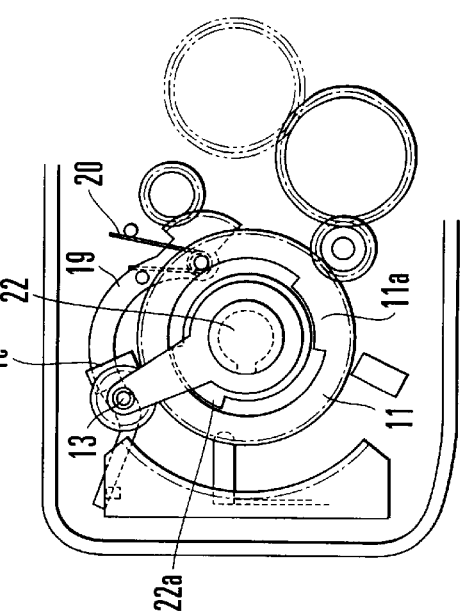
FIG.14(a)     FIG.14(b)
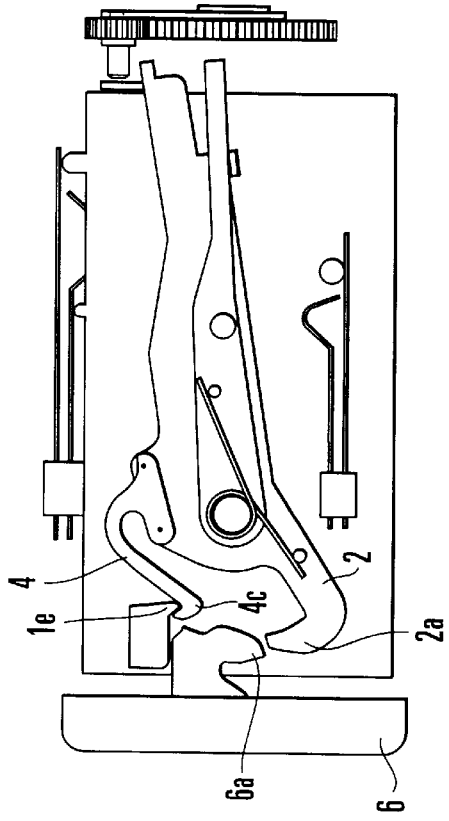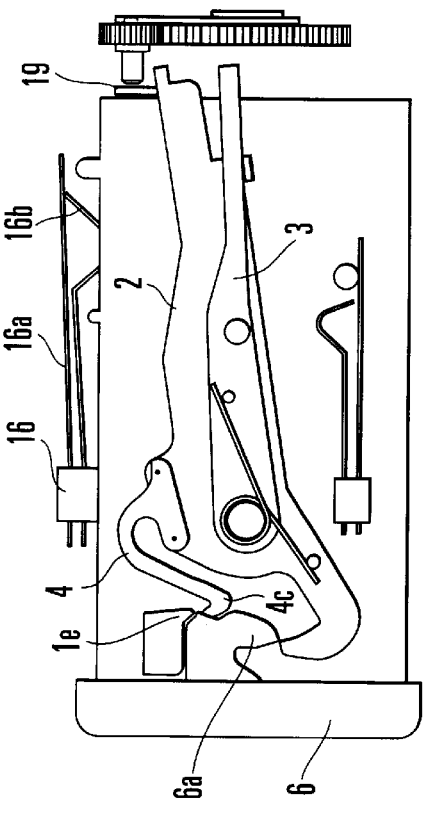
FIG.15(a)     FIG.15(b)

APPARATUS HAVING DEVICE FOR OPENING AND CLOSING COVER OF FILM CARTRIDGE CHAMBER

BACKGROUND OF THE INVENTION

1. Field of the Invention

The present invention relates to an improvement on a camera or a like apparatus having a device for opening and closing the cover of a film cartridge chamber provided in the camera or the like.

2. Description of Related Art

Some of cameras commercialized during recently years are arranged such that, when a film cartridge in which a whole film including its fore end part, i.e., a leader part, is completely wound within there is loaded in a film cartridge chamber, a fork is driven to cause the film to be pulled out from the film cartridge and taken up and wound around on a spool shaft of the camera.

A problem with the camera of this kind lies in that, if the cover of the cartridge chamber is inadvertently opened by the user while the film is in process of being pulled out from the film cartridge within the cartridge chamber, the film would be exposed to light. To solve this problem, various devices has been developed. For example, In a camera disclosed in Japanese Laid-Open Patent Application No. HEI 8-286245, a lock member is provided in a part of a film transport gear train for locking the cover of the cartridge chamber. The lock member is arranged to be kept in a lock position to make the cover of the cartridge chamber unopenable by preventing an opening operation on a knob provided for opening and closing the cartridge chamber, when the film is in process of being wound and rewound.

In the case of this camera, however, the lock member is in an unlocking position for the opening-and-closing knob while the rotating direction of a film transport motor is in process of being changed from a film winding direction over to a film rewinding direction. Therefore, at the time of this change-over, the opening-and-closing knob might happen to be inadvertently operated to open the cover of the cartridge chamber. In view of this shortcoming, in U.S. patent application No. 09/105,755 (Japanese patent application No. HEI 9-/190789), there is disclosed a device as an improvement on the camera of this kind, in which the cover of the cartridge chamber is arranged to be not openable without performing a film winding action and a film rewinding action respectively once and, after that, to become openable by rotation in the film feeding or winding direction (hereinafter sometimes referred to as the thrust direction).

Meanwhile, with a camera arranged to use a film cartridge of the kind having a data disk, when the camera is loaded with the film cartridge, the camera performs a reading action to read data provided on the data disk by rotating a film winding spool of the film cartridge in the film rewinding direction before the above-stated driving in the thrust direction (thrust driving).

Therefore, in a case where a film cartridge of this kind is to be used for the camera which is provided with the above-stated improvement disclosed in U.S. patent application No. 09/105,744, it has been impossible to read data from the data disk, because the film winding action and the film rewinding action are arranged to be performed respectively once before opening the cartridge chamber cover by the thrust driving. More specifically, it has been impossible to read the data because the cartridge chamber cover would be opened if the thrust driving is performed after data reading from the data disk.

BRIEF SUMMARY OF THE INVENTION

It is a first object of the invention to provide an apparatus having a device for opening and closing a film cartridge chamber cover arranged such that, as long as an opening operation member for the cartridge chamber cover is not operated, the cartridge chamber cover can not be opened even if a film winding spool of the film cartridge or a fork gear is caused to rotated forward or backward. In other words, the cartridge chamber cover is arranged to be openable only by operating the opening operation member.

Therefore, data can be read from the data disk by rotating the film winding spool in the direction of film rewinding before the thrust driving. Besides, in a case where the camera is loaded with a film cartridge which is used halfway, an unexposed frame can be searched out and then the film can be temporarily rewound to set the unexposed frame again at an exposure (aperture) position.

It is a second object of the invention to provide an apparatus having a cartridge chamber cover opening-and-closing device which is capable of preventing the setting of the film using state obtained at the end of rewinding from being varied by an unlocking action on the cartridge chamber cover.

It is a third object of the invention to provide an apparatus having a cartridge chamber cover opening-and-closing device which is capable of bringing a revolving member back to its standby position even under an irrational condition such as having an opening operation member for the cartridge chamber cover left inadvertently in an operated state, so that a film rewinding action can be carried out even under such an irrational condition.

To attain the above objects, in accordance with an aspect of the invention, there is provided a device for opening and closing a cover of a film cartridge chamber, comprising a gear member (11) having a gear part arranged to rotate for feeding and rewinding a film by engaging a supply spool of a film cartridge, a revolving member (12) arranged to engage the gear part and to be caused to revolve by rotation of the gear member, an opening operation member (7) provided for opening the cover, and a lock member (2, 3 and 5) arranged to lock the cover in a closed state or to unlock the cover, wherein the lock member moves from outside of a revolving travel locus of the revolving member to inside of the revolving travel locus of the revolving member in association with an operation of the opening operation member, and the lock member is driven by a revolving motion of the revolving member to unlock the cover. When the opening operation member is not operated, the lock member is located outside of the revolving travel locus. With the lock member at this position, therefore, the cover of the film cartridge chamber is never caused to open by film feeding (transport) and rewinding actions.

The device according to the invention further comprises a detection switch for detecting an operation position, for opening the cover, of the opening operation member, and a motor for driving and causing the gear part to rotate, wherein the motor causes the gear part to rotate when the opening operation member has been detected by the detection switch to be at the operation position.

In the device, the motor is arranged to rotate the gear part in the direction of feeding the film.

The device according to the invention further comprises a first detection switch arranged to detect whether or not the lock member is at an unlocking position, a second detection switch arranged to detect presence or absence of the film, and a motor provided for driving the gear part to rotate, wherein the motor drives the gear part to rotate in the direction of rewinding the film when the lock member has been detected by the first detection switch to be at a locking position and the film has been detected by the second detection switch to be absent.

The device further comprises an urging member arranged to urge the lock member to move toward a locking position thereof.

The device further comprises first and second restricting members arranged to define a movable range of the revolving member, and the revolving member is allowed to move within the movable range.

These and further objects and features of the invention will become apparent from the following detailed description of a preferred embodiment thereof taken in connection with the accompanying drawings.

BRIEF DESCRIPTION OF THE SEVERAL VIEWS OF THE DRAWING

FIGS. 8(a) and 8(b) show one state of each part of the camera obtained after the commencement of unlocking the cover of the cartridge chamber of the camera before completion of the process of unlocking.

FIGS. 9(a) and 9(b) show another state of each part of the camera obtained after the commencement of unlocking the cover of the cartridge chamber of the camera before completion of the process of unlocking.

FIGS. 14(a) and 14(b) show a still further state of each part of the camera obtained after the commencement of unlocking the cover of the cartridge chamber of the camera before completion of the process of unlocking.

FIGS. 15(a) and 15(b) show one state of the camera obtained during a period between loading the camera with the film cartridge and the commencement of film rewinding after completion of photo-taking.

DETAILED DESCRIPTION OF THE INVENTION

Hereinafter, a preferred embodiment of the invention will be described in detail with reference to the drawings.

Figure 1:
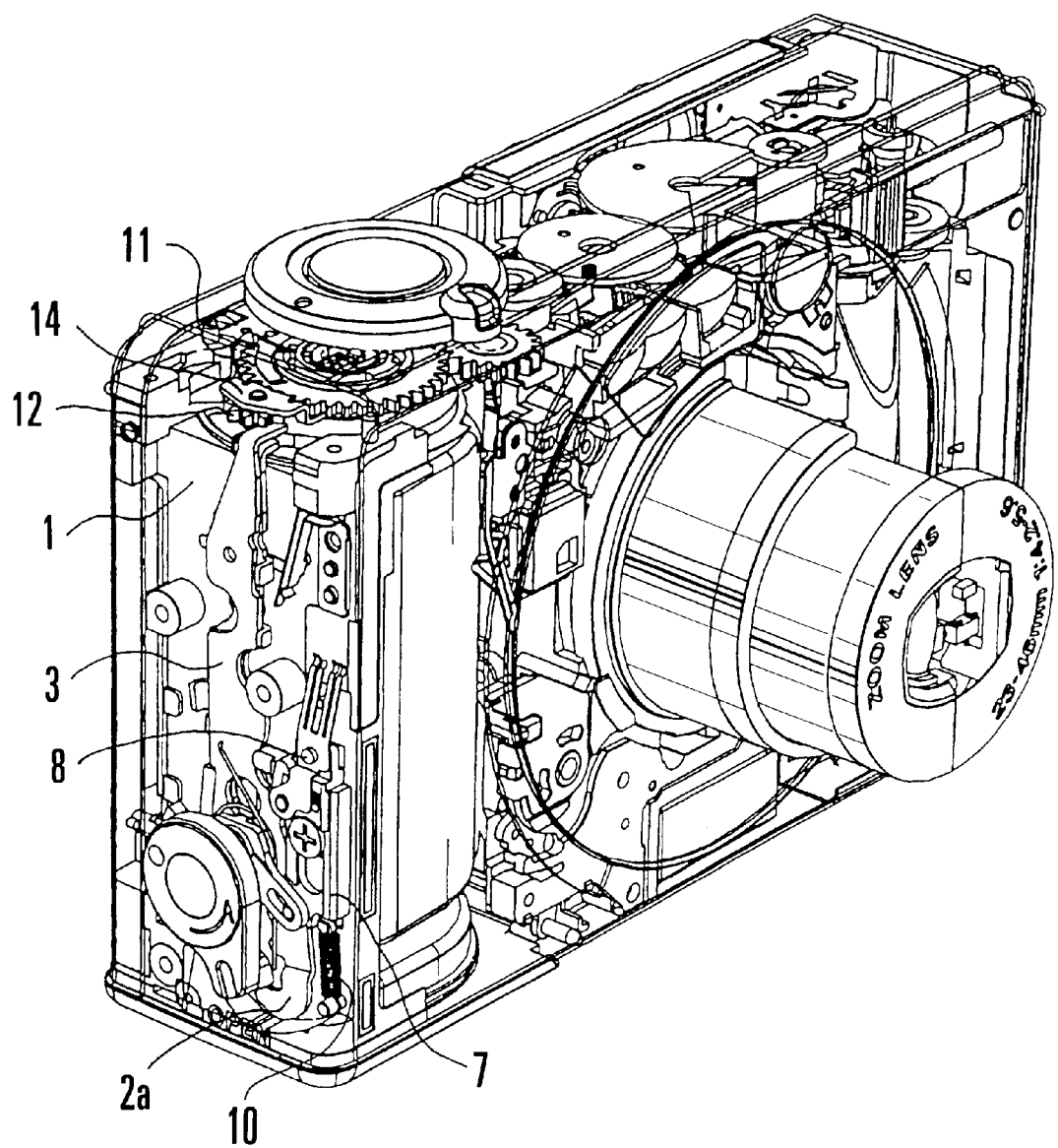
FIG. 1 is a perspective view showing a camera according to an embodiment of the invention.
Figure 2:
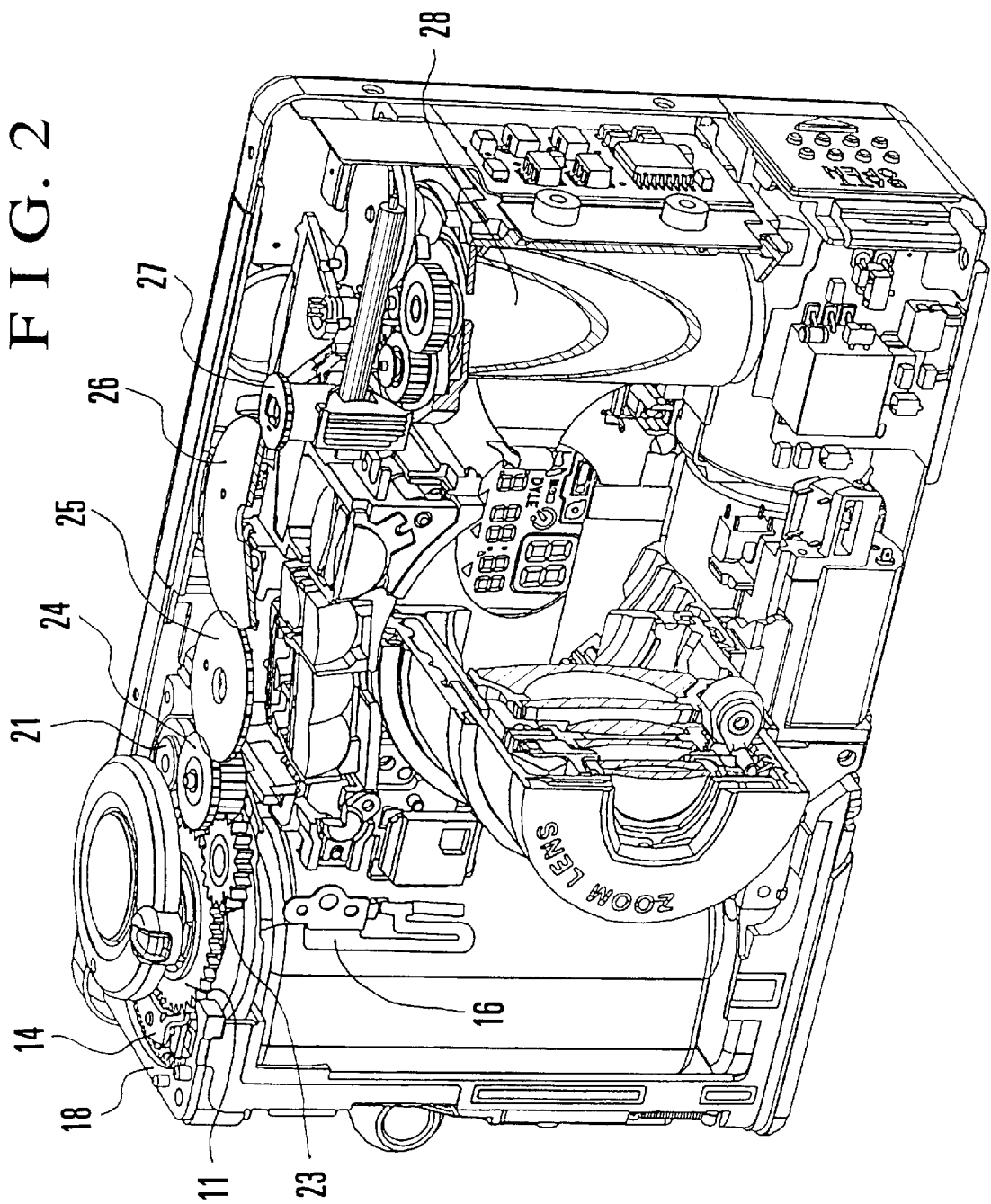
FIG. 2 is a perspective view showing the camera according to the embodiment of the invention.
Figure 3:
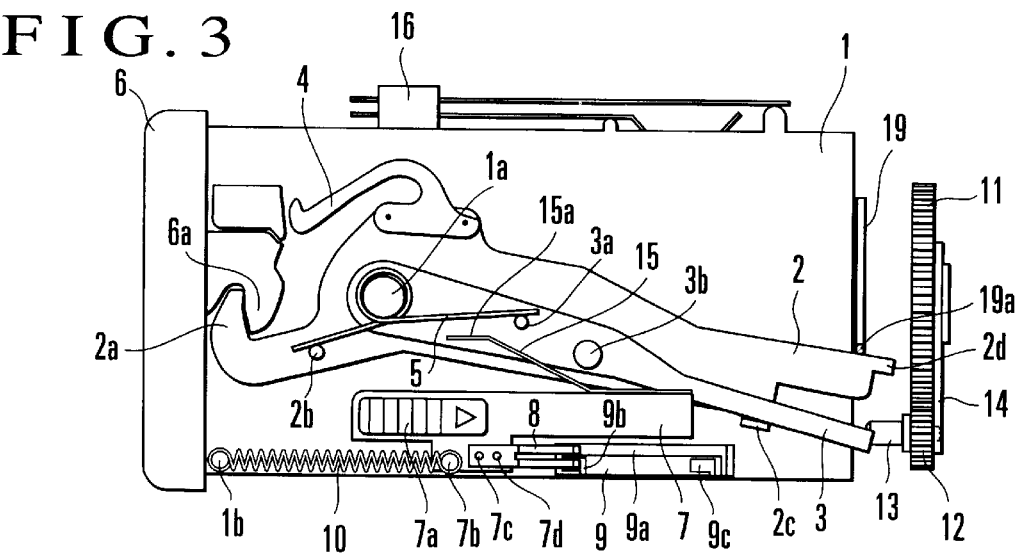
FIG. 3 is a simplified view of essential parts of the camera according to the embodiment of the invention.
Figure 4:
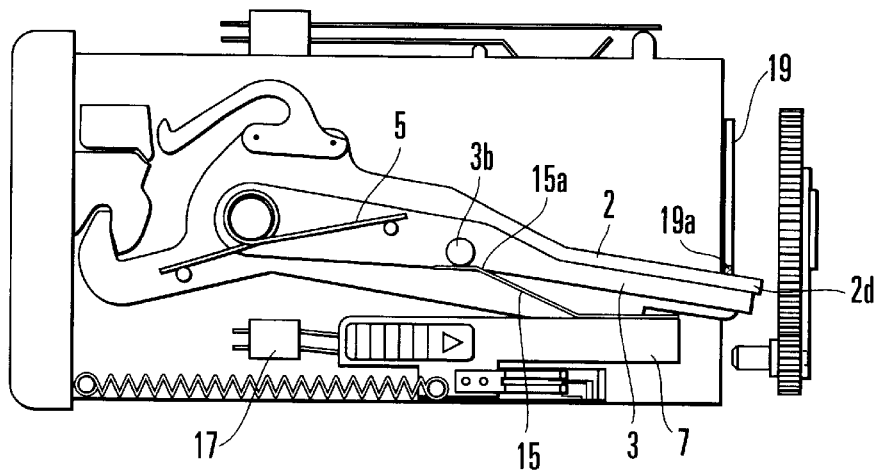
FIG. 4 is a simplified view of essential parts of the camera according to the invention.
Figure 5:
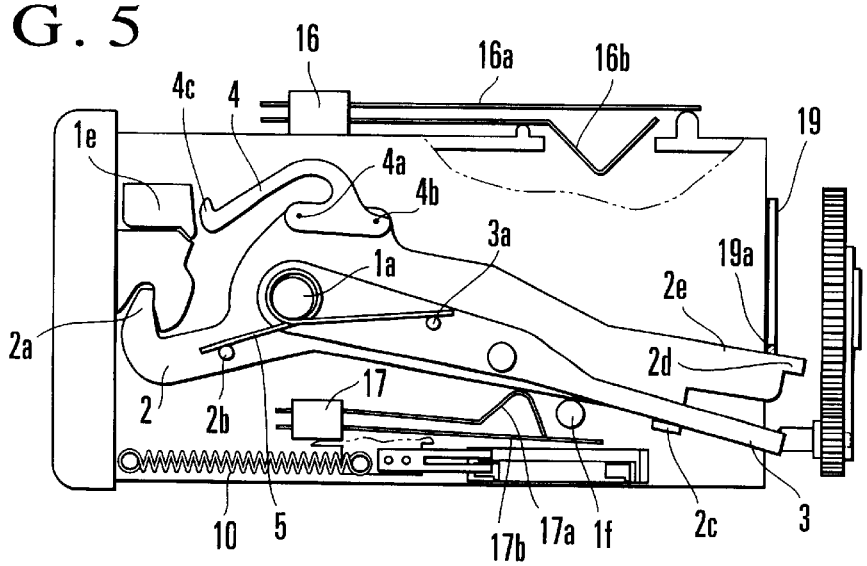
FIG. 5 is a simplified view of essential parts of the camera according to the embodiment of the invention.
Figure 6:
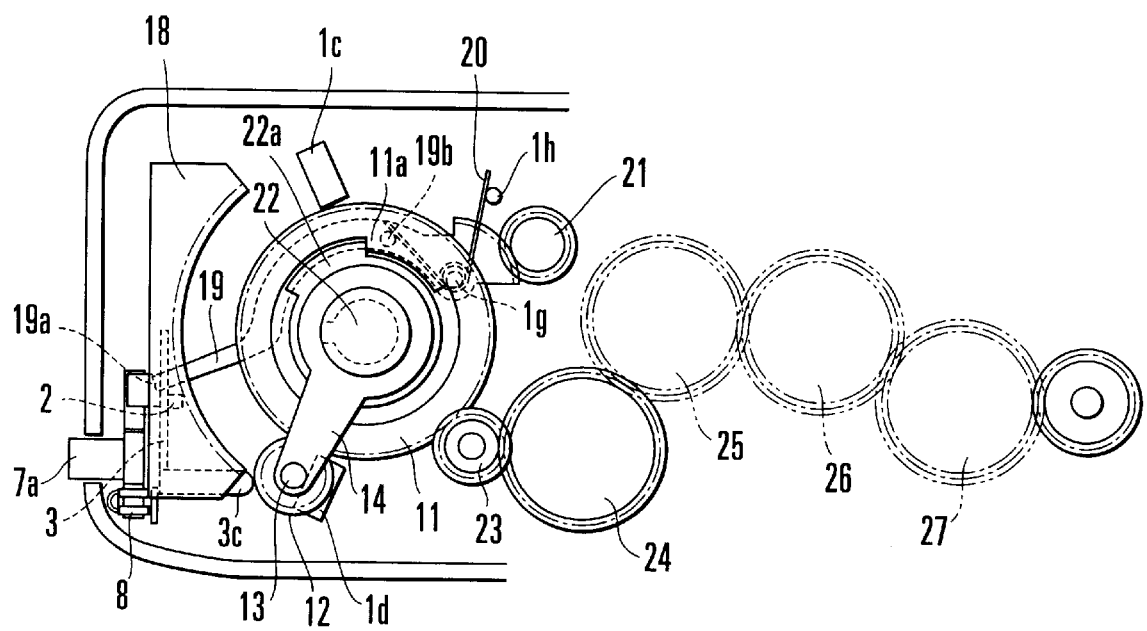
FIG. 6 shows the arrangement of parts of the camera as viewed from the right side of FIG. 3.
Figure 7:
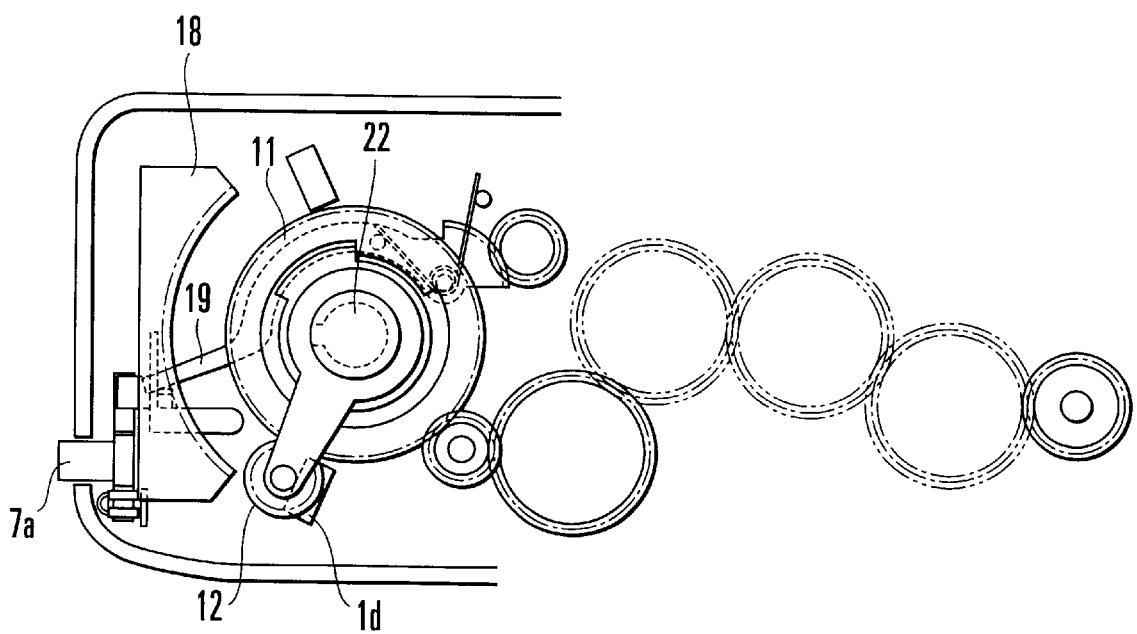
FIG. 7 shows the arrangement of parts of the camera as viewed from the right side of FIG. 4.

FIGS. 1 and 2 are skeleton perspective views showing a camera according to the embodiment of the invention. FIGS. 3 to 7 schematically show the arrangement of essential component parts of the camera. FIGS. 8(a) and 8(b) to FIGS. 20(a) and 20(b) show the actions of the essential component parts by further simplifying FIGS. 3 to 7. Of these figures, FIG. 6 shows the parts shown in FIG. 3 as viewed from on the right side of FIG. 3. FIG. 7 shows the parts shown in FIG. 4 as viewed from on the right side of FIG. 4. FIG. 5 shows the parts shown in FIGS. 3 and 4 by omitting in part a camera body 1 and an operation knob.

In FIGS. 1 to 7, reference numeral 1 denotes the body of the camera. A hook lever 2 is carried by a shaft 1a of the camera body 1 to be swingable thereon. A hook 2a provided on the hook lever 2 is arranged to be hooked on a claw part 6a of a cartridge chamber cover 6 to keep the cartridge chamber cover 6 in a locked state. A driving lever 3 is carried by the shaft 1a of the camera body 1 also to be swingable thereon, as in the hook lever 2. A torsion spring 5 which is carried by the shaft 1a of the camera body 1 is disposed between a shaft 3a secured to the driving lever 3 and a shaft 2a secured to the hook lever 2. The torsion spring 5 is thus arranged to urge the hook lever 2 to swing clockwise. Therefore, if no other force is acting on the driving lever 3, the driving lever 3 is caused by the urging force of the torsion spring 5 to be abutting on a bent-up part 2c of the hook lever 2.

As shown in FIG. 6, a sector lever 19 is carried by a shaft 1g of the camera body 1 to be swingable on the shaft 1g. A torsion spring 20 is arranged between a shaft 19b on the sector lever 19 and a shaft 1h on the camera body 1 to constantly urge the sector lever 19 to swing counterclockwise. Therefore, an abutting part 19a of the sector lever 19 abutting on the hook lever 2 is constantly urging the hook lever 2 to swing clockwise as viewed in FIG. 5. The hook lever 2 is thus abutting on a stopper shaft if of the camera body 1. Under this condition, completion of locking the cartridge chamber cover 6 can be detected, when the hook lever 2 comes to push a contact piece 17a of a lock completion switch 17 into contact with another contact piece 17b of the switch 17 to bring about a conductive state. This clockwise urging force is arranged to be stronger than the urging force of the torsion spring 5. Therefore, as will be described in detail later, when an operation knob 7 is operated, the driving lever 3 is alone allowed to swing counterclockwise on the shaft 1a to be set into a set position. A hook claw 4 is made of plastic having elasticity and is secured to the hook lever 2 by thermal fusion with positioning shafts 4a and 4b. Therefore, the hook claw 4 works together with the hook lever 2. The hook claw 4 is arranged to be in a free state while the cartridge chamber cover 6 is locked but to have its claw part 4c hooked on a lock 1e of the camera body 1 to maintain an unlocked state when the cartridge chamber cover 6 is unlocked.

The operation knob 7 which is provided for opening the cartridge camber cover 6 is arranged to be slidable to the right and left along a guide (not shown) with respect to the camera body 1. The operation knob 7 has an operation part 7a and shafts 7b, 7c and 7d. A tension spring 10 is arranged between the shaft 7b of the operation knob 7 and a shaft 1b of the camera body 1 to constantly exert an urging force leftward as viewed in FIG. 3. Under this urging force, the operation knob 7 is abutting on a stopper of a guide part (not shown) which is provided on the camera body 1. The shafts 7c and 7d have a switch contact piece 8 mounted thereon. The fore end part of the switch contact piece 8 is arranged to come into contact with a printed circuit board 9. When the operation knob 7 is abutting on the stopper of the leftward guide of the camera body 1 under the urging force of the tension spring 10, patterns 9a and 9b of the printed circuit board 9 are set in a conductive state by the switch contact piece 8 in such a way as to indicate that the operation knob 7 is not operated.

When the operation knob 7 is operated rightward against the urging force of the tension spring 10, the switch contact piece 8 renders patterns 9a and 9c of the printed circuit board 9 conductive to permit detection of that the operation knob 7 is in an operation completed state. A leaf spring 15 is secured to the operation knob 7. When the operation knob 7 is operated to the right from its position of FIG. 3 to a position as shown in FIG. 4, an elastic part 15a of the leaf spring 15 pushes a shaft 3b secured to the driving lever 3 to cause the driving lever 3 to abut on a stopper part 2d of the hook lever 2 by swinging counterclockwise against the urging force of the torsion spring 5. The hook lever 2 is thus set into a setting position where the cartridge chamber cover 6 can be unlocked by the rotation of a fork gear 11 as will be described later. To ensure setting into this setting position, the urging force of the leaf spring 15 is arranged to be stronger than the force of the torsion spring 5 and weaker than the rotative urging force of the torsion spring 20 of the sector lever 19. Therefore, the leaf spring 15 is thus arranged to warp, as shown in FIG. 4, after the driving lever 3 abuts on the stopper part 2d of the hook lever 2.

The fork gear 11 is arranged to rotate on a fork 22. In transmitting rotation to the fork 22, an abutting part 11a of the fork gear 11 abuts on an abutting part 22a of the fork 22 to enable the fork 22 to rotate along with the fork gear 11. FIG. 6 shows the fork gear 11 in a state of rotating counterclockwise to enable the fork 22 to rotate together therewith. When the fork gear 11 rotates clockwise from the state of FIG. 6, the abutting parts 11a and 22b do not abut on each other again until the fork gear 11 rotates clockwise at least 180 degrees, which is arranged as an idle rotation angle range. This idle rotation angle range of 180 degrees is provided for carrying out an unlocking action on the cartridge chamber cover 6.

A planet gear 12 is carried by a planetary lever 14 on its shaft 13 to be revolvable with rolling friction in mesh with the fork gear 11. Therefore, when a rotation torque of a film transport motor 28 (see FIG. 2) is transmitted to the fork gear 11 through a gear train (gears 23 to 27), the planet gear 12 is caused to revolve by the rolling friction. With the camera in the state of FIG. 6, when the fork gear 11 rotates counterclockwise, the planet gear 12 revolves also counterclockwise. Then the shaft 13 comes to abut on a stopper 1d of the camera body 1 which corresponds to an abutting position on one side. The stopper 1d thus brings the revolution of the planet gear 12 to a stop. Further, when the fork gear 11 rotates clockwise from the state of FIG. 6, the planet gear 12 revolves also clockwise to intermesh with an inner gear 18, so that the planet gear 12 comes to rotate while continuing to revolve. This increases the revolving torque of the shaft 13 to make it possible to unlock the cartridge chamber cover 6. When the planet gear 12 further continues its revolution, the planet gear 12 ceases to be in mesh with the inner gear 18 after completion of the process of unlocking the cartridge chamber cover 6. Then, the planet gear 12 comes to make only its revolution until the shaft 13 comes to abut on another stopper 1c of the camera body 1 which is located on the opposite side of the stopper 1d. The revolution of the planet gear 12 thus comes to a stop at the other abutting position.

A cartridge presence/absence detecting switch 16 is arranged to detect that the camera is loaded with a film cartridge when a projection of one contact piece 16b is pushed upward by the film cartridge into contact with the other contact piece 16a.

A gear 21 is arranged to open and close a light-lock door 21 set at the film cartridge and is arranged to be driven by the rotation of the sector lever 19. The details of this gear 21 are the same as those disclosed in U.S. patent application No. 09/105755 and are, therefore, omitted from the description given here.

FIGS. 8(a) and 8(b) to FIGS. 14(a) and 14(b) show the states of various parts obtained during a period between the commencement and completion of unlocking the cartridge chamber cover 6.

In the state shown in FIGS. 8(a) and 8(b), the cartridge presence/absence detecting switch 16 in an off-state. Therefore, the camera is loaded with no film cartridge. In this state, the shaft 13 of the planet gear 12 is abutting on the stopper 1d of the camera body 1 and the fork gear 11 is in a standby position which is equivalent to a film rewinding completing position.

The shaft 13 of the planet gear 12 does not abut on the driving part 3c of the driving lever 3 even if the fork gear 11 is rotated in the direction of thrust, i.e., in the clockwise direction, under the condition shown in FIGS. 8(a) and 8(b). Therefore, the unlocking action on the cartridge chamber cover 6 is not performed. Further, since the lock completion switch 17 is in its on-state, a control IC of the camera detects that the cartridge chamber cover 6 is locked.

When the operation knob 7 is moved to the right from its position shown in FIG. 8(a) and 8(b) to change a condition of having the patterns 9a and 9b in their on-states to a condition of having the patterns 9a and 9c in their on-states, preparation for unlocking the cartridge chamber cover 6 is completed as shown in FIGS. 9(a) and 9(b). When the state of the switch 9 of the operation knob 7 thus changes, the elastic part of the leaf spring 15 secured to the operation knob 7 pushes the shaft 3b of the driving lever 3 to cause the driving lever 3 to swing alone counterclockwise against the force of the torsion spring 5. The driving lever 3 thus comes to abut on the stopper part 2d of the hook lever 2. The elastic part of the leaf spring 15 then deforms as shown in FIG. 9(a).

In this instance, with the condition of having the patterns 9a and 9b in their on-states having changed to the condition of having the pattern 9a and 9c in their on-states, the control IC of the camera causes the motor 28 to be driven to rotate the fork gear 11 in the thrust direction, i.e., in the clockwise direction.

Figure 10A:
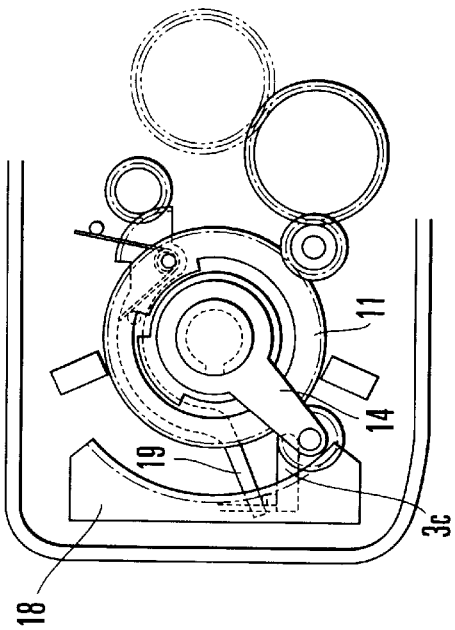
FIGS. 10(a) and 10(b) show a further state of each part of the camera obtained after the commencement of unlocking the cover of the cartridge chamber of the camera before completion of the process of unlocking.
Figure 10B:
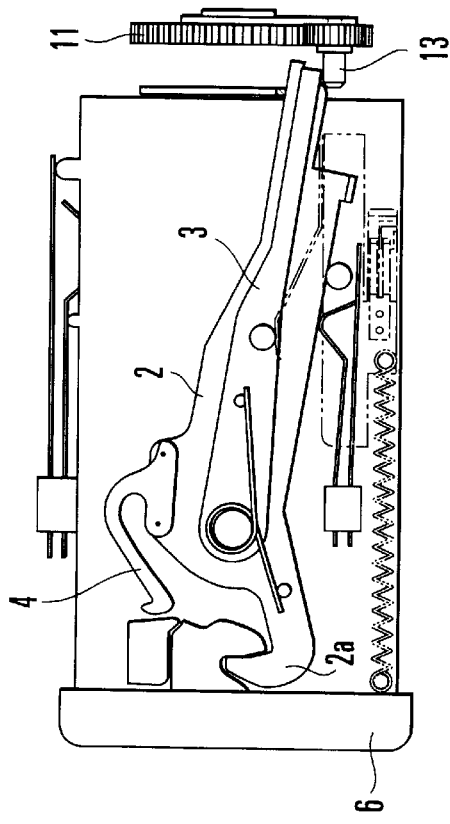

In the state of FIG. 9(b), the driving part 3c of the driving lever 3 is located in the revolving locus of the shaft 13 of the planet gear 12. Therefore, the fork gear 11 is rotated clockwise, i.e., in the direction of thrust, to cause the driving part 3c of the driving lever 3 to abut on the shaft 13 of the planet gear 12, as shown in FIGS. 10(a) and 10(b). Then, the fork gear 11 is allowed to go on rotating clockwise to have the state of FIGS. 11(a) and 11(b) and further to have the state of FIGS. 12(a) and 12(b). The cartridge chamber cover 6 is thus unlocked as shown in FIG. 12(a).

Figure 12B:
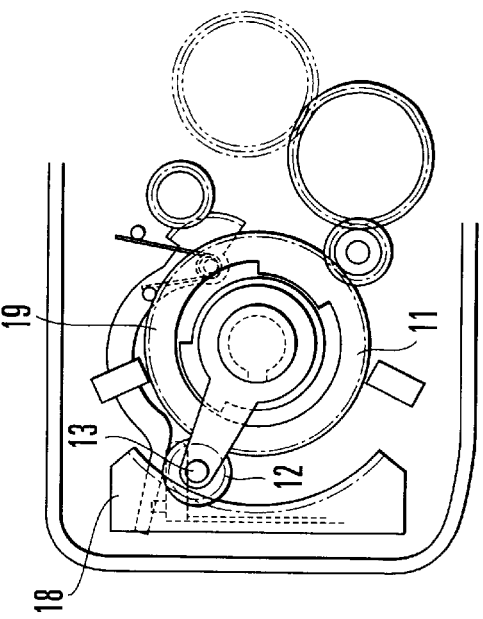
FIGS. 12(a) and 12(b) show a further state of each part of the camera obtained after the commencement of unlocking the cover of the cartridge chamber of the camera before completion of the process of unlocking.
Figure 13B:
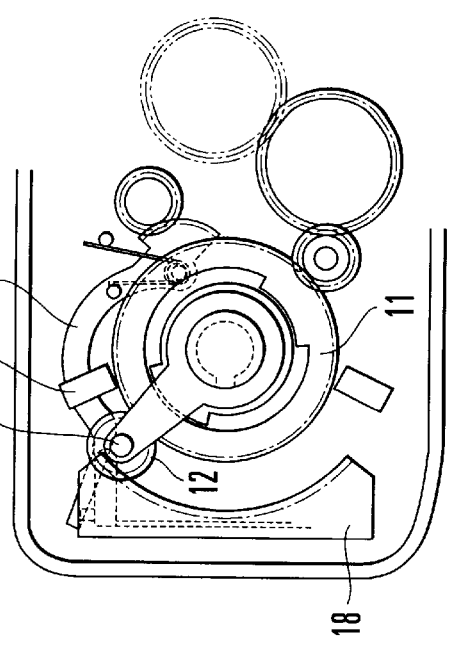
FIGS. 13(a) and 13(b) show a further state of each part of the camera obtained after the commencement of unlocking the cover of the cartridge chamber of the camera before completion of the process of unlocking.
Figure 12A:
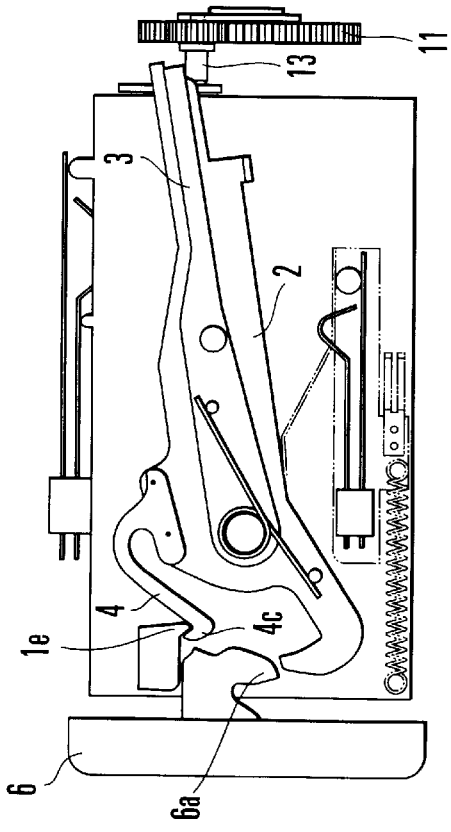
Figure 13A:
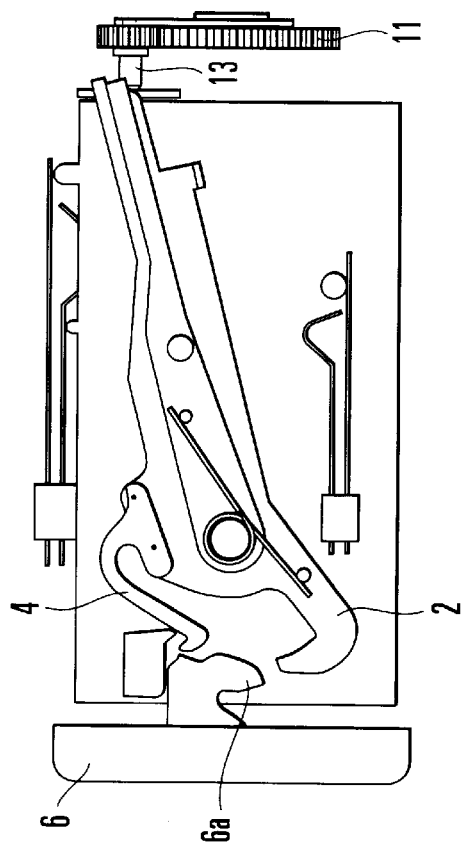

In the state of FIGS. 12(a) and 12(b), the cartridge chamber cover 6 is completely unlocked. The hook claw 4 then has its claw part 4c hooked on the lock part 1e of the camera body to keep the unlocked state. However, since the shaft 13 of the planet gear 12 is abutting on the driving part 3c of the driving lever 3 in this state, the clockwise rotation of the fork gear 11 continues still further to bring about the state of FIGS. 13(a) and 13(b) and to change it further into the state of FIGS. 14(a) and 14(b) until the shaft 13 of the planet gear 12 comes to abut on the stopper 1c of the camera body 1. This control can be accomplished by causing an energizing timer to count the time of energizing of the film transport motor 28 from the time when the lock completion switch 17 turns off from its on-state. The control arrangement gives a sufficient allowance for the angle of idle rotation after the commencement of rotation of the fork gear 11 until the fork 22 comes to rotate.

In the state of FIGS. 14(a) and 14(b), the abutting parts 11a and 22a of the fork gear 11 and the fork 22 are away from each other as shown in FIG. 14(b). Therefore, the cartridge chamber cover 6 can be unlocked and the shaft 13 of the planet gear 12 can be caused to about on the stopper 1c of the camera body 1 within the range of the idle rotation angle. Further, in this state, the claw part 4c of the hook claw 4 is hooked on the lock part 1e of the camera body 1 to keep the hook part 2a of the hook lever 2 and the hook part 6a of the cartridge chamber cover 6 in their unlocking positions.

This state of the camera enables its user to load it with a film cartridge by fully opening the cartridge chamber cover 6.

FIGS. 15(a) and 15(b) to FIGS. 18(a) and 18(b) show the states of the camera obtained during a period from the end of photo-taking after the film cartridge is loaded until the commencement of film rewinding.

FIGS. 15(a) and 15(b) show the camera in a state obtained immediately after the cartridge chamber cover 6 is closed with the camera having been loaded with the film cartridge.

Since the camera is loaded with the film cartridge, the cartridge presence/absence detecting switch 16 is in an on-state, in which the contact piece 16a is in contact with the contact piece 16b. With the cartridge chamber cover 6 closed, the claw part 4c of the hook claw 4 is pushed to elastically deform by the hook part 6a of the cartridge chamber cover 6. In the deformed shape, the claw part 4c is detached from the lock part 1e of the camera body 1. Since the hook lever 2 is urged by the torsion spring 20 of the sector lever 19 to swing clockwise as viewed in FIG. 15(a), the instant the claw part 4c of the hook claw 4 detaches from the lock part 1e, the hook lever 2 swings clockwise to bring about a state shown in FIGS. 16(a) and 16(b). In this state, the hook part 2a of the hook lever 2 and the hook part 6a of the cartridge chamber cover 6 interlock. The hook lever 2 abuts on the stopper shaft 1f of the camera body 1 and pushes the contact piece 17a of the lock completion switch 17 to render the contact pieces 17a and 17b conductive to enable the control IC of the camera to detect that the cartridge chamber cover 6 is closed. Under this condition, since both the lock completion switch 17 and the cartridge presence/absence detecting switch 16 are in their on-states, the control IC of the camera detects that the camera is loaded with the film cartridge. The control IC then comes to make preparations for photo-taking.

Figure 16B:
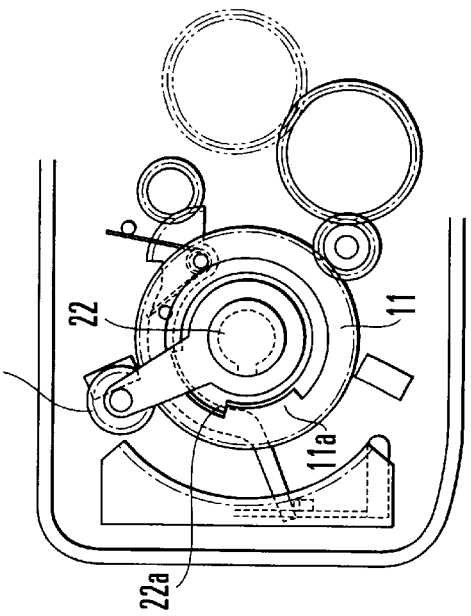
FIGS. 16(a) and 16(b) show another state of the camera obtained during a period between loading the camera with the film cartridge and the commencement of film rewinding after completion of photo-taking.
Figure 16A:
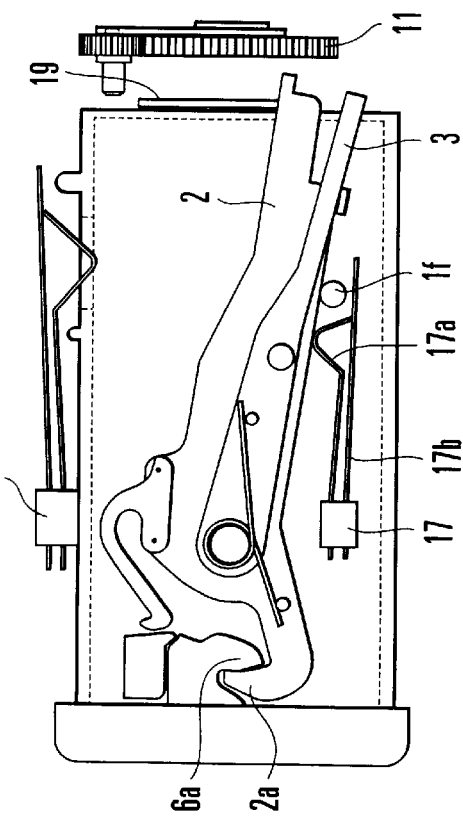

For changing the state of FIG. 15(b) to the state of FIG. 16(b), the fork gear 11 is driven by the film transport motor 28 to rotate clockwise after the lock completion detecting switch 17 is turned on. The clockwise rotation of the fork gear 11 causes the abutting parts 11a and 22a of the fork gear 11 and the fork 22 to abut each other. The fork gear then drives the fork 22 to rotate clockwise to thrust the film forward and thus to complete the photo-taking preparations.

Figure 17B:
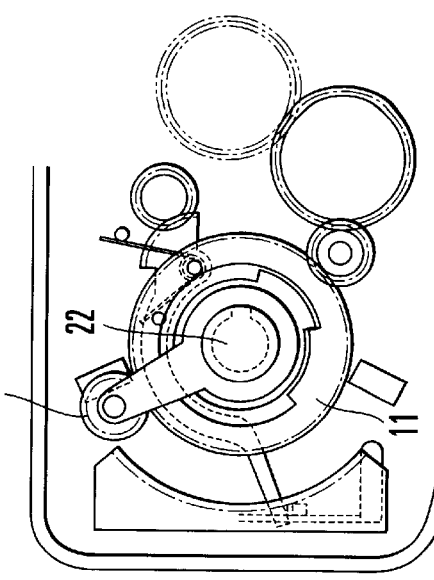
FIGS. 17(a) and 17(b) show a further state of the camera obtained during a period between loading the camera with the film cartridge and the commencement of film rewinding after completion of photo-taking.
Figure 17A:
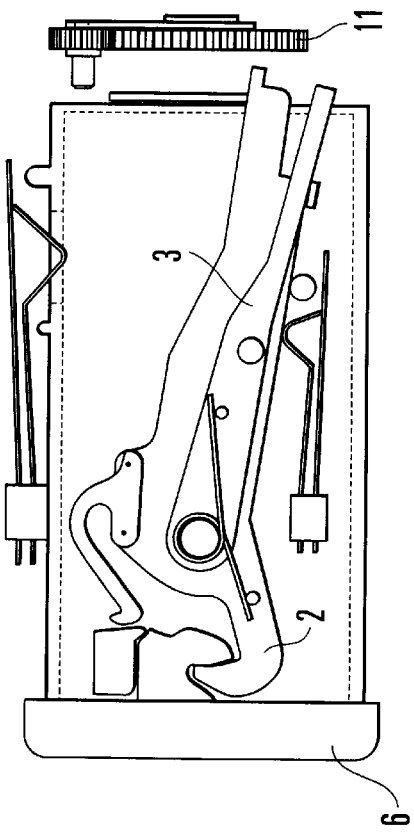
Figure 18A:
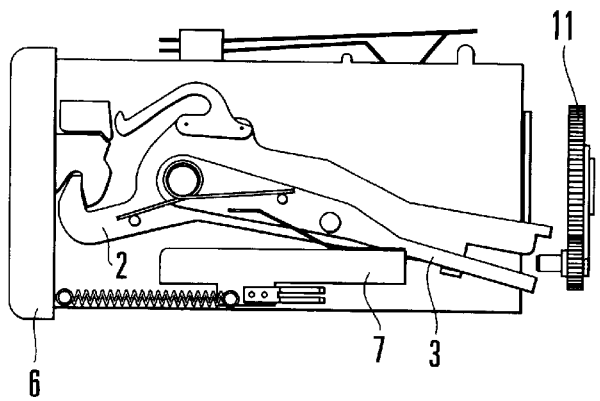
FIGS. 18(a) and 18(b) show a still further state of the camera obtained during a period between loading the camera with the film cartridge and the commencement of film rewinding after completion of photo-taking.
Figure 18B:
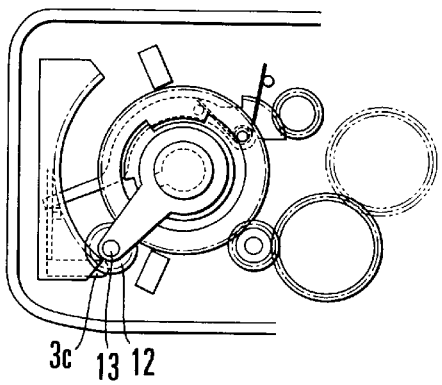

FIGS. 17(a) and 17(b) show a state obtained upon completion of photo-taking on all the frames of the film and immediately before either the commencement of automatic film rewinding or the commencement of rewinding the film in a halfway used state.

After several frames of the film have been exposed for photo-taking, the film winding speed of the camera becomes faster than the film thrusting speed of the fork gear 11. This brings about a state in which the abutting part 22a of the fork 22 comes to push the abutting part 11a of the fork gear 11. In that state, the fork gear 11 is caused to rotate no longer by the film transport motor 28 but by the fork 22. Any difference resulting from this change is absorbed by a one-way mechanism (not shown).

In the state of FIGS. 17(a) and 17(b), when the fork gear 11 is caused to rotate counterclockwise by energizing the film transport motor 28 in the direction of film rewinding, the planet gear 12 comes to revolve also counterclockwise. The planet gear 12 is then driven to change its position of FIG. 18(b) to its position shown in FIG. 8(b). Then, the film rewinding action comes to an end upon completion of setting an indication showing the using state of the film cartridge. In this instance, since the driving part 3c of the driving lever 3 is of course not located within the revolving locus of the shaft 13 of the planet gear 12, the shaft 13 never abuts on the driving part 3c.

FIGS. 19(a) and 19(b) and FIGS. 20(a) and 20(b) show states obtained when an irrational operation is performed at the commencement of the film rewinding action.

Figure 19A:
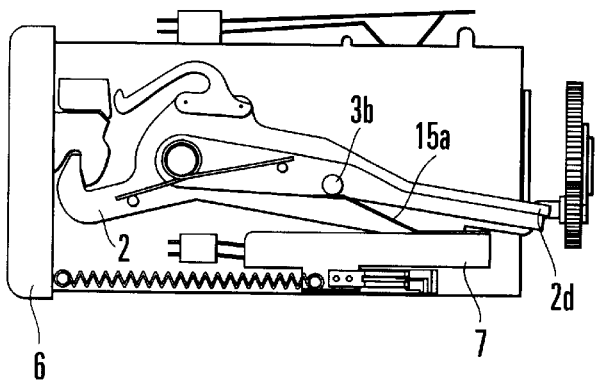
FIGS. 19(a) and 19(b) show a state of the camera obtained when an irrational operation is performed at the commencement of film rewinding.
Figure 19B:
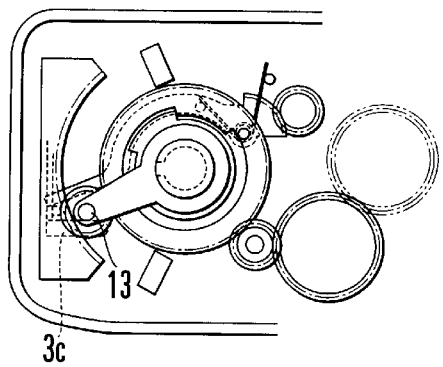
Figure 20A:
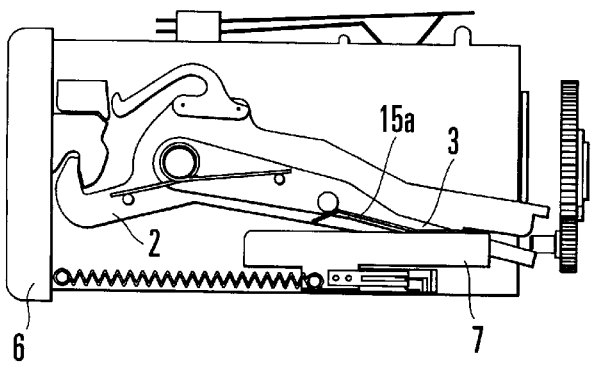
FIGS. 20(a) and 20(b) show another state of the camera obtained when an irrational operation is performed at the commencement of film rewinding.
Figure 20B:
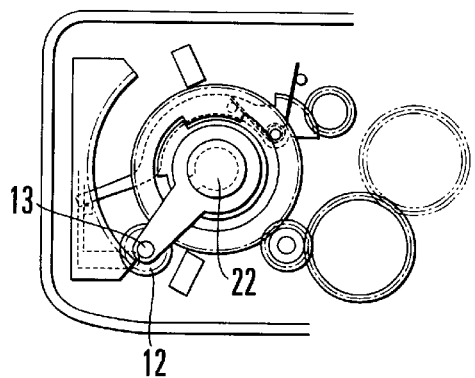

In the case of FIGS. 19(a) and 19(b), the shaft 3b of the driving lever 3 is caused to be pushed with the elastic part 15a of the leaf spring 15 by operating the operation knob 7. The driving lever 3 is thus caused to swing counterclockwise against the urging force of the torsion spring 5 until the driving lever 3 abuts on the stopper part 2d of the hook lever 2. The driving lever 3 is thus set in a set position where the cartridge chamber cover 6 can be unlocked by the rotation of the fork gear 11. The driving part 3c of the driving lever 3 is then set within the revolving locus of the shaft 13 of the planet gear 12. After that, the film rewinding action is allowed to be performed. The shaft 13 then of course comes to abut on the driving part 3c of the driving lever 3. However, when the film rewinding action is carried on under this condition as shown in FIGS. 20(a) and 20(b), the elastic part 15a of the leaf spring 15 is elastically deformed to allow the shaft 13 of the planet gear 12 to revolve further, so that the state of the FIGS. 20(a) and 20(b) can be shifted to the state of FIGS. 8(a) and 8(b). This enables the camera to carry out the film rewinding action irrespective of the irrational operation.

Figure 11A:
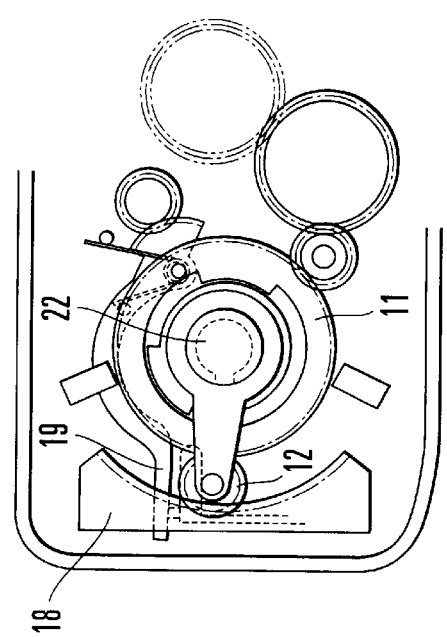
FIGS. 11(a) and 11(b) show a further state of each part of the camera obtained after the commencement of unlocking the cover of the cartridge chamber of the camera before completion of the process of unlocking.
Figure 11B:
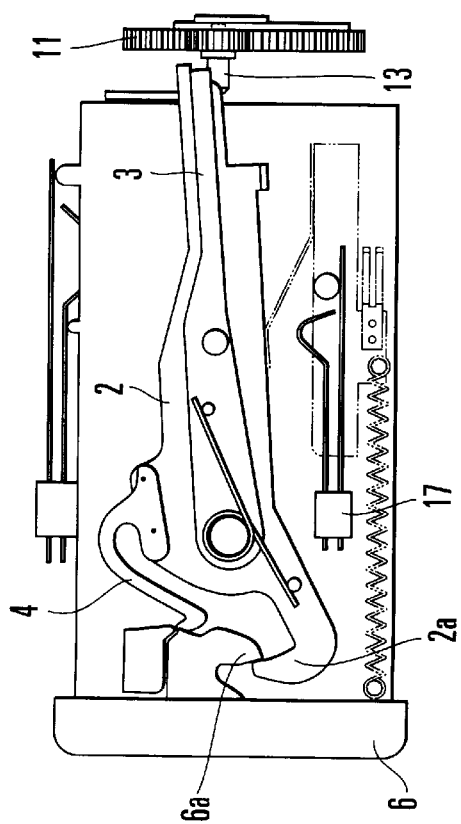

Further, after the display indication is set to indicate the using state of the film cartridge to complete the film rewinding action, the operation knob 7 is operated for taking the film cartridge out from the camera body 1 to shift the state of FIGS. 8(a) and 8(b) to the state of FIGS. 11(a) and 11(b). In that instance, if the cartridge chamber cover 6 is irrationally held, for example, by the hand or the like to prevent the cartridge chamber cover 6 from being opened, the state of the camera shifts from the state of FIGS. 11(a) and 11(b) to the state of FIGS. 15(a) and 15(b) and further to the state of FIGS. 16(a) and 16(b) in such a way as to lock the cartridge chamber cover 6 again before the cartridge chamber cover 6 opens. Under such a condition, the lock completion switch 17 alone turns off from its on-state and then again turns on, while the cartridge presence/absence detecting switch 16 is left in its on-state. The turning-off-and-on state of the switch 17 enables the control IC of the camera to find that the film cartridge has not been taken out as yet. The control IC then causes the fork gear 11 to be driven counterclockwise to bring the planet gear 12 back to its standby position shown in FIGS. 8(a) and 8(b).

At this time, even if the operation knob 7 is operated while the switch contact piece 8 is in its on-state, the planet gear 12 can be brought back to the standby position without fail in the same manner as in the cases of FIGS. 19(a) and 19(b) and FIGS. 20(a) and 20(b). However, if the action of bringing the planet gear 12 back to the standby position is repeated many times, the idle rotation allowance for the fork gear 11 and the fork 22 becomes unstable. This problem can be solved and the idle rotation allowance for the fork gear 11 and the fork 22 can be stably set by always setting the using state of the film cartridge in bringing the planet gear 11 back to its standby position.

In the above-stated case, the operation knob 7 is operated not particularly as an irrational operation. However, the embodiment is arranged such that, after the action of bringing the planet gear 12 back to the standby position is performed as the cartridge chamber cover 6 fails to open, for example, due to some malfunction, the unlocking action on the cartridge chamber cover 6 is not allowed to be carried out unless the patterns 9a and 9c of the switch contact piece 8 are found to be turned on after they are turned off once, even if the operation knob 7 is operated while the patterns 9a and 9c of the switch contact piece 8 are in their on-states. This arrangement effectively prevents an attempt to perform the unlocking action on the cartridge chamber cover 6 from being uselessly carried on until the electric energy of a power supply comes to exhaust. A safety effect can be enhanced by arranging the cartridge chamber cover unlocking action to be inhibited unless the patterns 9a and 9c of the switch contact piece 8 are detected to be turned on again after the patterns 9a and 9b are turned on, not only after having the contacts 9a and 9c turned off once.

Other conceivable irrational operations include a case where the operation knob 7 is operated while the camera is in process of performing some action. In such a case, possible dangers are avoidable by suspending the action of the camera when the patterns 9a and 9b of the switch contact piece 8 are turned off. The camera action does not have to be suspended in the case of the action of bringing the planet gear 12 into the standby position by rotating the fork gear 11 in the direction of film rewinding, because no trouble arises in this case. However, when the fork gear 11 rotates clockwise as in the case of thrust driving from the standby position, the cartridge chamber cover 6 might be unlocked. In that case, the camera action is suspended until the patterns 9a and 9b of the switch contact piece 8 turn on.

Figure 21:
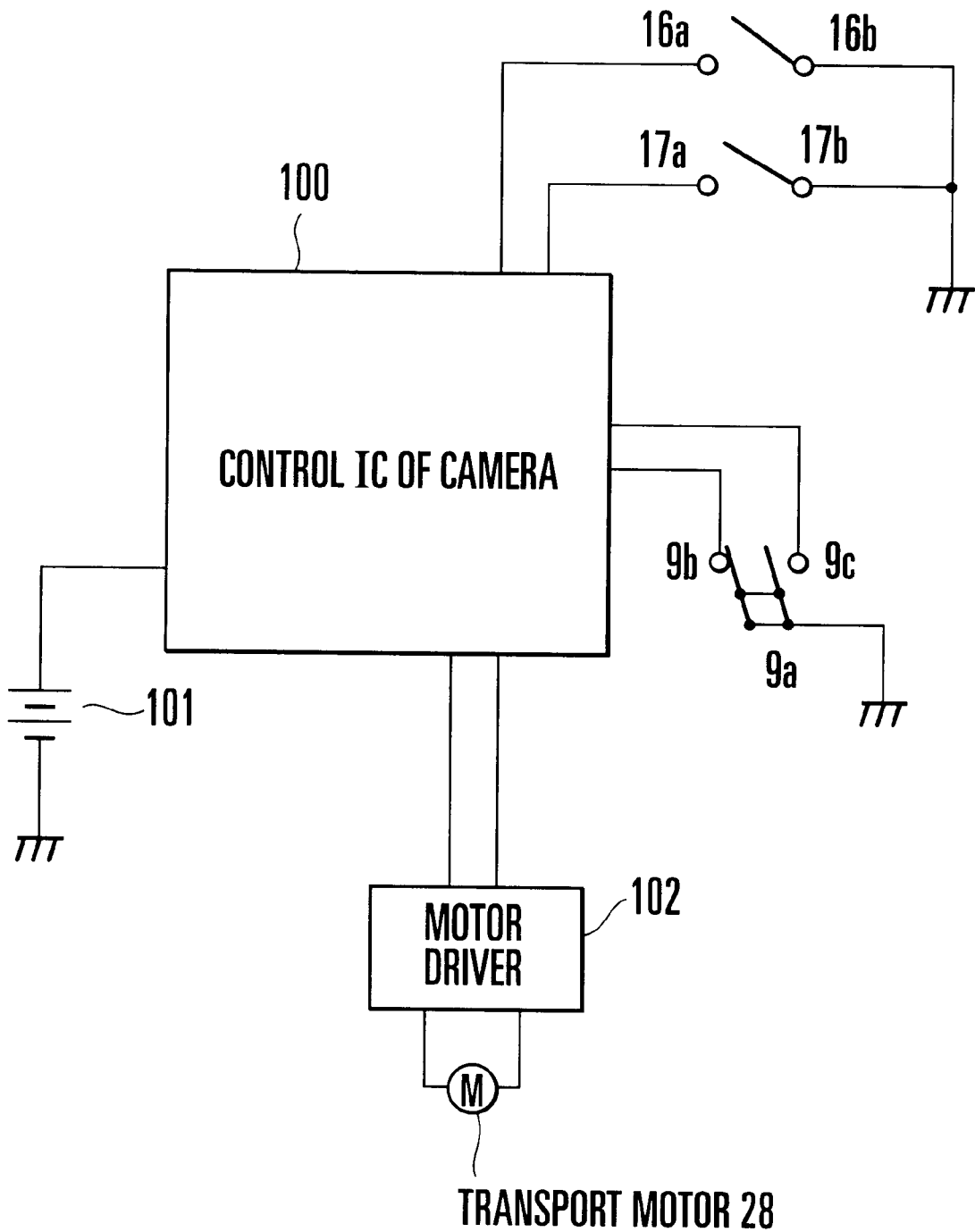
FIG. 21 is a block diagram showing the electrical arrangement of essential parts of the camera according to the embodiment of the invention.

FIG. 21 is a block diagram showing the electrical arrangement of only such parts that essentially relate to the embodiment of the invention.

Referring to FIG. 21, the control IC 100 of the camera is arranged to control various actions. A battery 101 is used as a power supply for the camera. A motor driver 102 is arranged to drive the film transport motor 28. The cartridge presence/absence detecting switch 16 has contact pieces 16a and 16b. The lock completion switch 7 has contact pieces 17a and 17b. The patterns 9a, 9b and 9c are arranged together with the switch contact piece 8 (not shown in FIG. 21) to detect the operated state of the operation knob 7. The switch contact piece 8 is arranged to turn on the patterns 9a and 9b when the operation knob 7 is not operated and to turn on the patterns 9a and 9c when the operation knob 7 is operated. These states of the operation knob 7 are expressed herein, for the sake of expedience, as "the patterns 9a and 9b are on" and "the patterns 9a and 9c are on".

Figure 22:
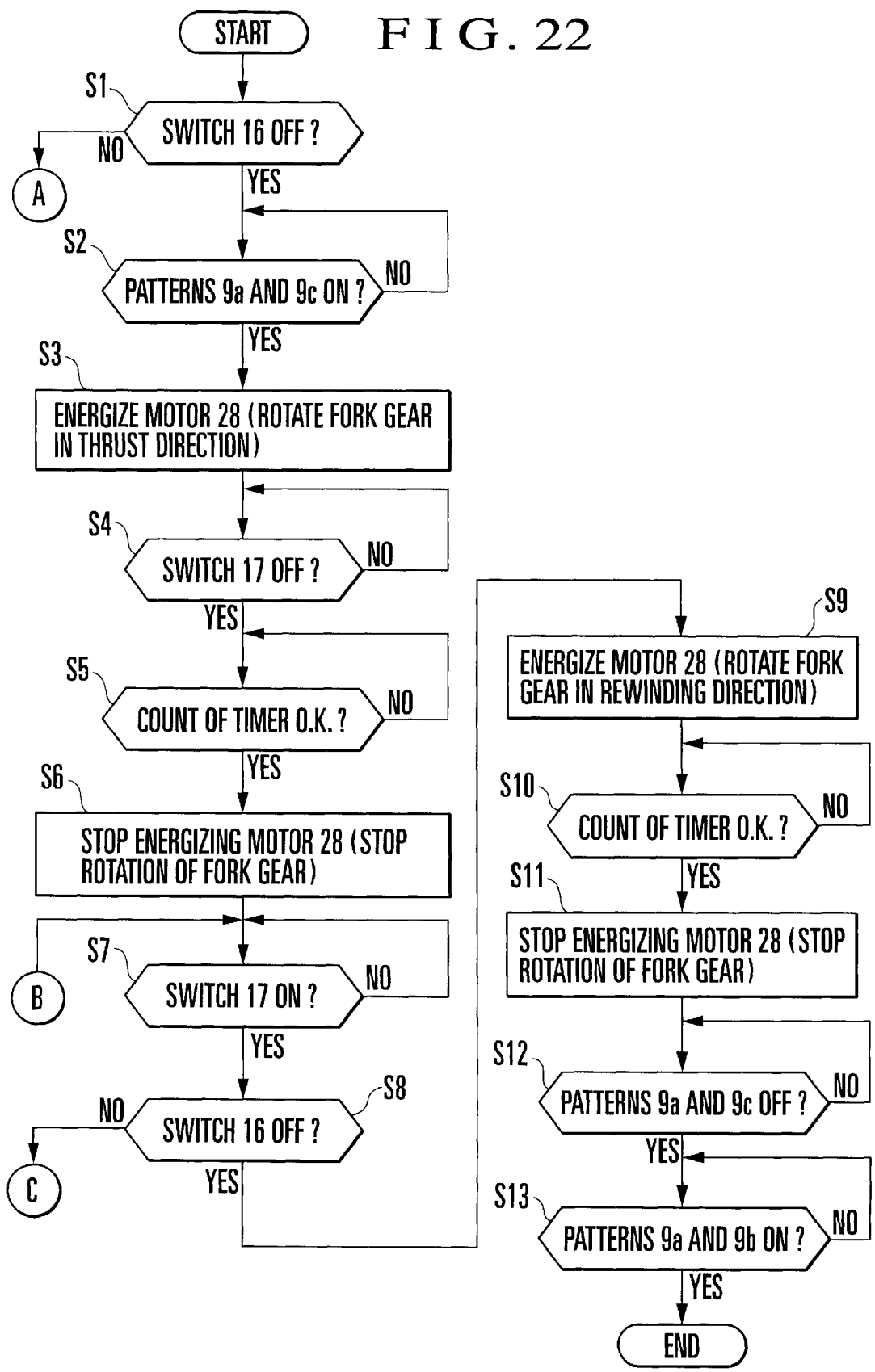
FIG. 22 is a flow chart showing in part a flow of processes to be executed by the camera including processes of unlocking the cover of the cartridge chamber.
Figure 23:
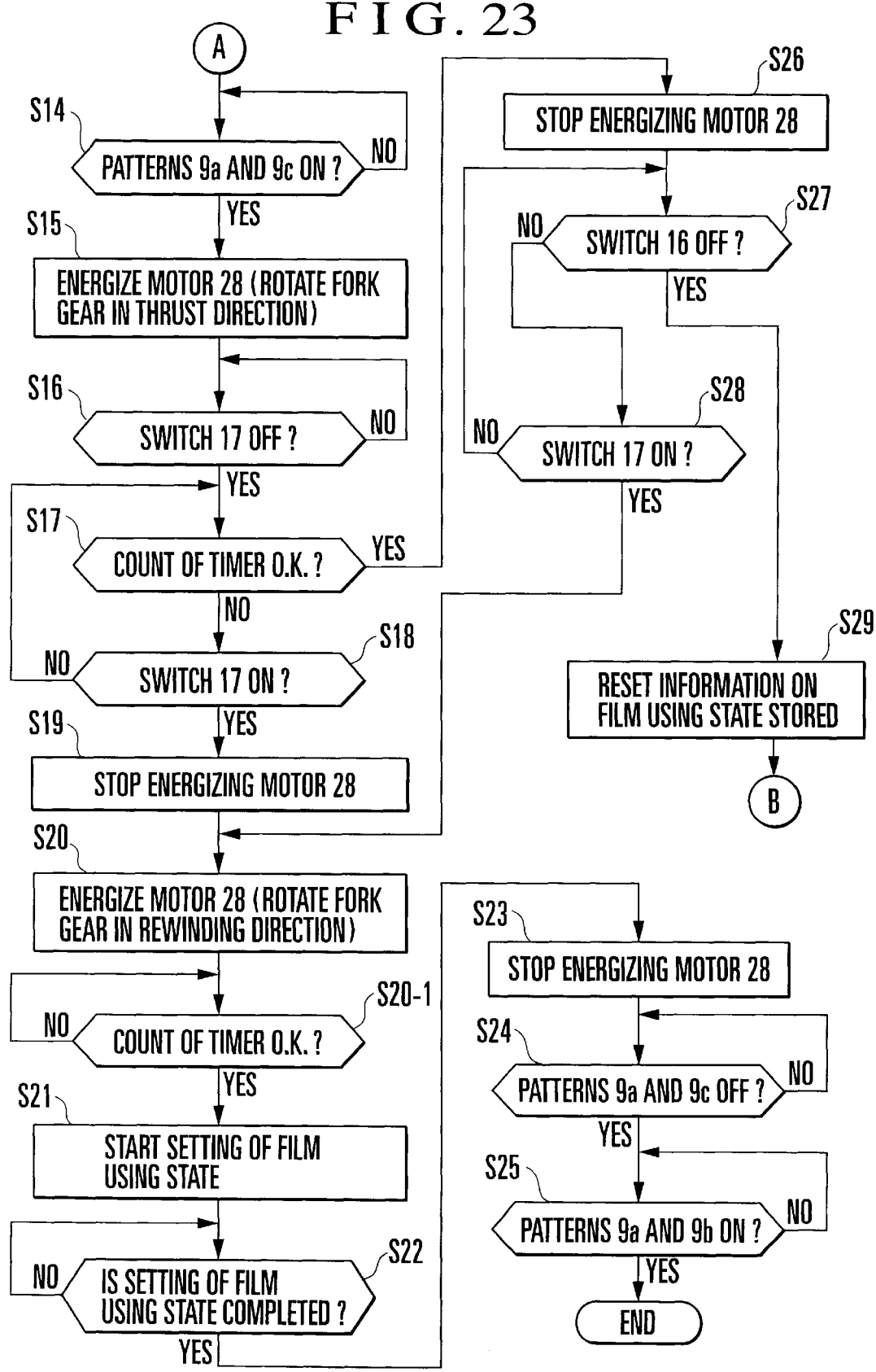
FIG. 23 is a flow chart showing another part of the flow of processes executed by the camera continuing from processes shown in FIG. 22.
Figure 24:
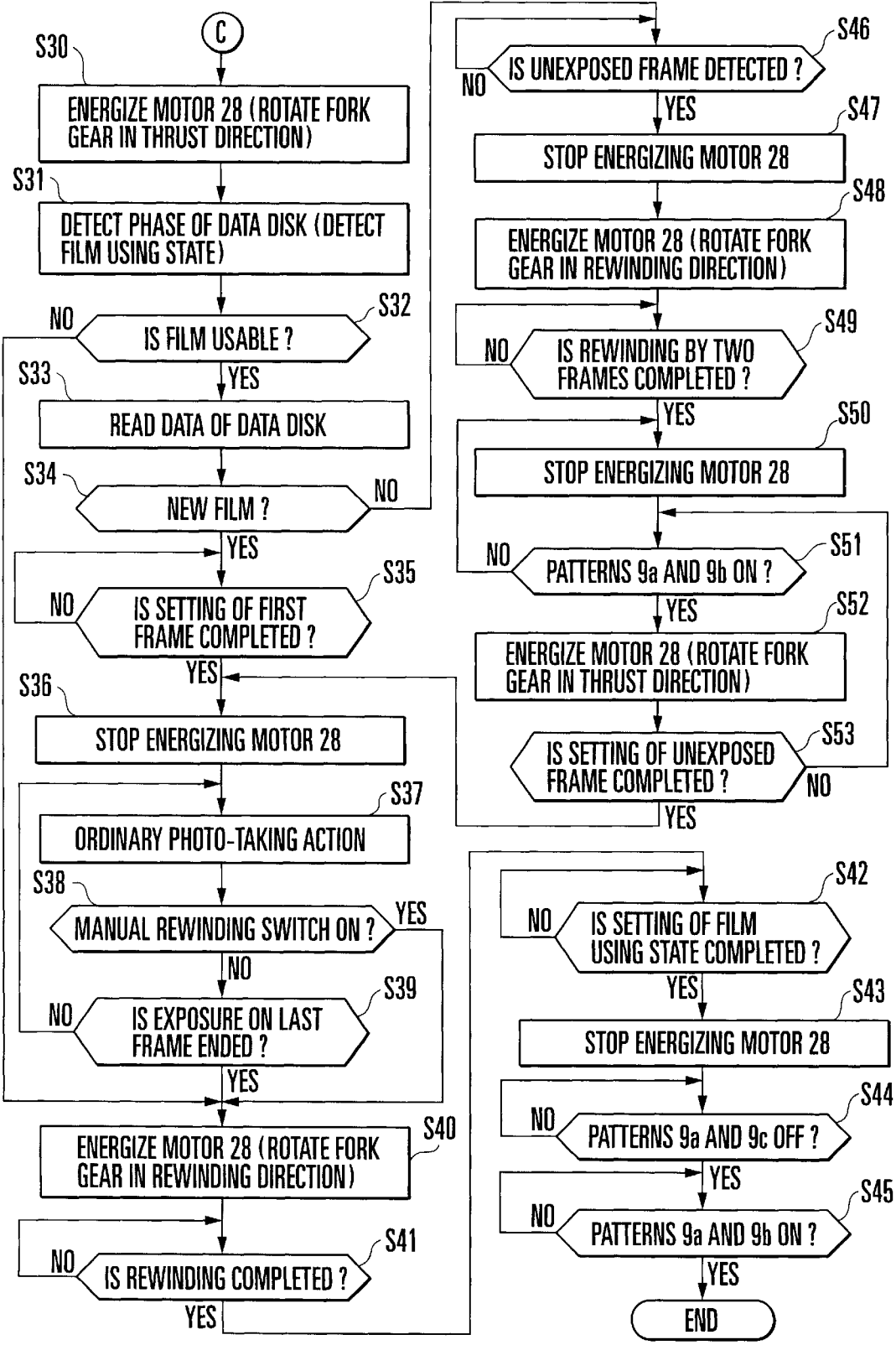
FIG. 24 is a flow chart showing a further part of the same flow of processes continuing also from the processes shown in FIG. 22.

FIGS. 22, 23 and 24 are flow charts showing a flow of operation of the embodiment including the unlocking action on the cartridge chamber cover 6. The operation is described below with reference to these flow charts.

At a step S1, a check is made by the control IC 100 to find if the cartridge presence/absence detecting switch 16 (hereinafter referred to simply as the switch 16) is in an on-state or off-state. In other words, the check is made to find whether or not the camera is loaded with a film cartridge. If the switch 16 is found to be in its off-state thus indicating the absence of the film cartridge, the flow proceeds to a step S2. At the step S2, the flow waits until the patterns 9a and 9c turn on. In other words, the flow of operation remains in a standby state until the operation knob 7 is operated to open the cartridge chamber cover 6. When the camera is not loaded with any film cartridge, the fork gear 11 is always in a standby position. In that case, it is not necessary to make a check for the on-states of the patterns 9a and 9b. Therefore, in that case, the check is made only for the on-state of the patterns 9a and 9c as mentioned above without making any check for the states of the patterns 9a and 9b.

When the patterns 9a and 9c turn on, the flow proceeds from the step S2 to a step S3. At the step S3, the film transport motor 28 is driven through the motor driver 102 to rotate the fork gear 11 in the direction of thrust. By this, the unlocking action on the cartridge chamber cover 6 is caused to begin. The planet gear 12 then begins to revolve clockwise. The driving lever 3 and the hook lever 2 which are located within the locus of revolution come to swing counterclockwise. Then, the lock completion switch 17

(hereinafter referred to simply as the switch 17) which has been in its on-state eventually comes to turn off, as shown in FIGS. 11(a) and 11(b). At the next step S4, the flow waits for turningoff of the switch 17. When the switch 17 turns off, the flow proceeds from the step S4 to a step S5. At the step S5, the flow waits for completion of a predetermined count by a timer. Meanwhile, the planet gear 12, the driving lever 3, etc., are moving from the state of FIGS. 12(a) and 12(b) to the state of FIGS. 13(a) and 13(b) and further to the state of FIGS. 14(a) and 14(b), as mentioned in the foregoing. The above-stated use of timer may be replaced, for example, with some other arrangement to detect the rotational frequency of the film transport motor 28.

Upon completion of the predetermined count by the timer, the flow proceeds from the step S5 to a step S6 as the camera has already reached by then the state of FIGS. 14(a) and 14(b). At the step S6, the driving action of the film transport motor 28 is brought to a stop. At this time, the cartridge chamber cover 6 has already been unlocked. The cartridge chamber cover 6 is then caused to be fully opened by swinging the cartridge chamber cover 6 on a hinge shaft (not shown) under the urging force of a spring (not shown). The camera can be loaded with a film cartridge in this state. At the next step S7, the flow waits until the switch 17 turns on. When the switch 17 turns on thus indicating that the cartridge chamber cover 6 is closed, the flow proceeds to a step S8. At the step S8, a check is made through the state of the switch 16 to find if the camera is actually loaded with the film cartridge. If the switch 16 is found to remain in its off-state, it indicates either that the cartridge chamber cover 6 is closed again without loading the film cartridge or that the cartridge chamber cover 6 is irrationally prevented from opening by the hand at the time of unlocking the cartridge chamber cover 6. In such a case, the flow proceeds from the step S8 to steps S9, S10 and S11 one after another. At these steps S9, S10 and S11, the planet gear 12 is brought back to its standby position by driving the motor 28 for a predetermined period of time to cause the fork gear 11 to rotate in the direction of film rewinding. At steps S12 and S13, the flow waits until the patterns 9a and 9c turn off and, after that, the patterns 9a and 9b turn on. The flow then comes to an end. The steps S12 and S13 are provide as a safety measure for preventing a restart of operation with the operation knob 7 left at an operated position.

In a case where the camera is found at the step S1 to have already been loaded with a film cartridge, the flow proceeds from the step S1 to a step S14 (FIG. 23). At the step S14, the flow waits until the operation knob 7 is operated for taking out the film cartridge. In other words, a check is made to find if the patterns 9a and 9c turn on. If so, the flow proceeds to a step S15. At the step S15, the motor 28 is driven to rotate the fork gear 11 in the direction of thrust for unlocking the cartridge chamber cover 6. At the step S16, the flow waits until the switch 17 turns off, that is, waits for the state of FIGS. 11(a) and 11(b). When the switch 17 turns off, the flow proceeds to a step S17. At the step S17, the flow waits until completion of a predetermined count by the timer for the shift of the state of FIGS. 11(a) and 11(b) to the state of FIGS. 14(a) and 14(b). The state of the switch 17 is thus checked during this waiting period. The step S17 is provided in consideration of possibility of having the cartridge chamber cover 6 in a state of being prevented by the hand from opening when the cartridge chamber cover 6 is unlocked, as mentioned above. In a case where the cartridge chamber cover 6 is kept closed by an irrational operation or the like, the switch 17 turns on before completion of the predetermined count. In that case, the hook claw 4 fails to be hooked on the lock part 1e of the camera body 1 to cause the driving lever 3 and the hook lever 2 to come back to their positions of FIGS. 16(a) and 16(b), even when the state of FIGS. 14(a) and 14(b) shifts to the state of FIG. 15(a) and 15(b).

If the switch 17 is found at the step S18 to be in its on-state, the flow proceeds to a step S20 and, then, a step S20–1. At the steps S20 and S20–1, in order to bring the planet gear 12, etc., back to their standby positions, the film transport motor 28 is driven to rotate the fork gear 11 in the direction of film rewinding for a period of a predetermined count by the timer. After that, at steps S21 and S22, since the idle rotation allowance for the fork 22 and the fork gear 11 might have disappeared by then, the film using state is set again. After completion of this setting, the flow proceeds from the step S22 to a step S23. At the step S23, the driving action of the motor 28 is brought to a stop. At steps S24 and S25, the flow waits until the patterns 9a and 9c turn off and then the patterns 9a and 9b turn on. After that, the flow comes to an end.

Further, in a case where the predetermined count by the timer is found at the step S17 to have finished without having the switch 17 turn on before the end of the count which indicates the shift of the state of FIGS. 11(a) and 11(b) to the state of FIGS. 14(a) and 14(b), the flow proceeds from the step S17 to a step S26. At the step S26, the driving action of the film transport motor 28 which has begun at the step S15 is brought to a stop. At the next step S27, a check is made for the state of the switch 16 to find whether or not the film cartridge is taken out. If the switch 17 is turned on without turning off the switch 16, this state indicates a case where the film cartridge is not taken out and the cartridge chamber cover 6 is closed, despite the fact that the cartridge chamber cover 6 is unlocked and opened in a normal manner. In that case, therefore, the flow proceeds from the step S28 to the step S20. Then, the processes of the steps S21 to S25 are executed, including setting the planet gear 12 in its standby position, setting the film using state, etc., before the flow is terminated.

If the switch 16 is found at the step S27 to be in its off-state thus indicating that the film cartridge is taken out in a normal manner. The flow proceeds from the step S27 to a step S29. At the step S29, the control IC 100 resets information on the film using state stored in a memory disposed therein. The flow then proceeds to the step S7 of FIG. 22 to wait for closing of the cartridge chamber cover 6.

Further, if the switch 16 is found at the step S8 of FIG. 22 to be in its on-state thus indicating that the camera is loaded with a film cartridge, the flow proceeds from the step S8 of FIGS. 22 to a step S30 of FIG. 24. At the step S30, the film transport motor 28 is driven to rotate the fork gear 11 in the direction of thrust. At the next step S31, the using state of the film cartridge, such as a unexposed state, a halfway exposed state, etc., of the film cartridge, is detected by detecting the phase of a data disk provided on the film cartridge. The method for making this detection is well known and, therefore, the details of the detecting method are omitted from the description. The reading action on the data disk may be performed by driving the film in the direction of film rewinding. At a step S32, the result of detection of the state of the film is checked to find if the film is usable. If not, i.e., in the event of a developed film or a film having all frames thereof already exposed, the flow proceeds from the step S32 to a step S40. At the step S40, the motor 28 is driven to rotate the fork gear 11 in the direction of film rewinding. At the next step S41, the flow waits for completion of film rewinding. At a step S42, information on the film using state is set. At a step S43, the driving action of the film transport motor 28 is brought to a stop. After the step S43, the flow proceeds to steps S44 and S45 to wait until the patterns 9a and 9c turn off and then the patterns 9a and 9b turn on. After that, the flow is terminated.

If the film is found at the step S32 to be a usable film, such as a new film or a halfway exposed film, the flow proceeds from the step S32 to a step S33. At the step S33, information on the film of varied kinds, such as the prescribed number of frames of the film, an ISO sensitivity value of the film, etc., is read from the data disk. At the next step S34, a check is made to find if the film is a new film. If so, the flow proceeds to a step S35. At the step S35, an automatic loading action is performed to set the first frame of the film at an aperture position. At a step S36, the driving action of the film transport motor 28 is brought to a stop. At a step S37, a normal photo-taking action is performed. The photo-taking action is performed until all the prescribed number of frames are found to have been exposed at a step S39. However, in a case where a manual rewinding switch is found at a step S38 to be turned on while the photo-taking action is performed only on an intermediate frame, i.e., only halfway on the film, the flow proceeds from the step S38 to the step S40 to rewind the film in the manner as described above before termination of the flow. Further, in the case of completion of the photo-taking action on all the prescribed number of frames, the flow proceeds from the step S39 also to the step S40 to rewind the film before termination of the flow.

Further, if the film with which the camera is currently loaded is found at the step S34 to be a halfway used (exposed) film, the flow proceeds from the step S34 to steps S46 and S47. At the steps S46 and S47, a leader frame among other unexposed frames is set at the aperture position in accordance with a known method by using a magnetic head (not shown). After that, the motor 28 is brought to a stop. In this instance, the motor 28 is allowed to overrun to an extent corresponding, for example, to about one frame before the motor 28 comes to a stop. Therefore, at subsequent steps S48 to S53, the leader frame among unexposed frames is precisely set at the aperture position by rewinding a two-frame amount of the film including the overrunning frame and, after that, by winding the film to an extent corresponding to one frame.

After rewinding the two-frame amount of film, the thrust winding action is performed at the step S52. However, since the fork gear 11 rotates from a film rewinding side to the trust direction for this action, if the operation knob 7 happens to be operated at this time, the cartridge chamber cover 6 would be unlocked to cause the film to be accidentally exposed to light. To prevent this trouble in thrust-driving the fork gear 11 after the two-frame rewinding rotation, therefore, it is necessary to monitor and ensure, at the step S51, that the patterns 9a and 9b are in their on-states, i.e., to ensure that the operation knob 7 is not operated during this process. If the operation knob 7 is irrationally operated during this process, the patterns 9a and 9b turn off. In that event, the flow proceeds from the step S51 back to the step S50 to stop the film transport motor 28 from rotating to stop the cartridge chamber cover 6 from being unintentionally unlocked.

When the patterns 9a and 9b turn on again with the operation knob 7 released from an operation thereon, the flow proceeds from the step S51 to the next step S52. At the step S52, the film transport motor 28 is driven to cause the fork gear 11 to rotate again in the direction of thrust. At the step S53, a check is made to find if the leader of unexposed frames is completely set in the aperture position. If so, the flow proceeds from the step S53 to the step S36. At the step S36, the motor 28 is stopped from rotating by deenergizing the motor 28 and the flow comes to do the normal photo-taking action.

A series of processes thus comes to an end.

The advantages of the embodiment of the invention are recapitulated as follows.

1) After the operation knob 7 is operated for opening the cartridge chamber cover 6, the fork gear 11 is rotated to cause the planet gear 12 to revolve. The revolution of the planet gear 12 causes the hook lever 2 and the driving lever 3 to move from their state shown in FIGS. 10(a) and 10(b) to the state of FIGS. 11(a) and 11(b) and, then, to the state of FIGS. 12(a) and 12(b) in such a way as to permit unlocking the cartridge chamber cover 6. When the operation knob 7 is not operated, no restriction is imposed on the rotating direction of the film winding spool of the film cartridge. Under this condition, therefore, the spool is rotated in the direction of film rewinding before thrust driving, so that data provided on the data disk can be read. In a case where the camera is loaded with a halfway-used film cartridge (containing a film having some frames left unexposed or unused), a search is made for unexposed frames. Upon completion of the search, the film is rewound once and, after that, the leader of unexposed frames can be adequately set in position.

2) The fork 22 which engages the film supply spool of the film cartridge and the fork gear 11 which drives the fork 22 are arranged to have a predetermined idle rotation angle. In rotating the fork gear 11 for unlocking the cartridge chamber cover 6 after the operation knob 7 is operated, the fork gear 11 is arranged not to drive the fork 22, as shown in FIGS. 9(a) and 9(b) to FIGS. 15(a) and 15(b). This arrangement effectively prevents information on the film using state set upon completion of film rewinding from being varied by the unlocking action on the cartridge chamber cover 6.

3) The driving lever 3, etc., which are provided for moving the cartridge chamber cover 6 to an unlocking position through the rotation of the fork gear 11 after the operation of the operation knob 7 are arranged to be set in position by means of the leaf spring 15 which is an elastic member. Therefore, even under such an irrational operation that the operation knob 7 is left at its operated position, the driving lever 3, etc., can be brought back to their standby positions by deforming the leaf spring 15. That arrangement permits film rewinding even under such a condition.

4) The cartridge chamber cover 6 might happen to be held by the hand to prevent the cartridge chamber cover 6 from opening after completion of the unlocking action performed on the cartridge chamber cover 6 by the rotation of the fork gear 11 with the operation knob 7 operated. In such a case, the fork gear 11 is arranged to be rotated back to the standby position which is obtained before the operation knob 7 is operated. That arrangement permits a prompt restart under such an irrational operation, so that the operability of the camera can be enhanced.

5) In the case of Para. 4) above, the rotation of the fork gear 11 with the cartridge chamber cover 6 not opened is arranged to be made in the direction of film rewinding. Therefore, the film is never thrust-driven again, so that a restart can be promptly made to enhance the operability of the camera.

6) In a case where the camera is loaded with a film cartridge when the driving lever, etc., are brought back to their standby positions, the embodiment is arranged to reset the display indication of a film using state. The arrangement enhances the reliability of the display indication of the film using state.

7) The arrangement for unlocking the cartridge chamber cover 6 by causing the fork gear 11 to rotate after the operation knob 7 is operated is not only applicable to a camera but can be simply made applicable also to any other apparatuses of the kind to be loaded with a film cartridge with a minor modification.

8) The embodiment is arranged to bring the rotation of the fork gear 11 to a stop when the operation knob 7 is found to be operated while the fork gear 11 is rotating, i.e., while the planetary gear mechanism is in process of revolution. The arrangement thus effectively prevents any malfunction from taking place in a case where the cartridge chamber cover 6 should not be opened.

9) In the event of Para. 8) above, the fork gear 11 is inhibited from rotating only in the direction of thrusting the film winding speel forward to prevent any malfunction in a case where a malfunction is possible. If there is no possibility of a malfunction, the rotation of the fork gear 11 in that direction is not brought to a stop, so that the operability of the camera can be enhanced.

10) In the event of such a trouble that the cartridge chamber cover 6 is, for example, held by the hand and cannot be opened, despite completion of unlocking the cartridge chamber cover 6 by the rotation of the fork gear 11 with the operation knob 7 operated, the fork gear 11 is rotated to bring the state of the camera back to a state obtained before the operation knob 7 is operated. However, if the operation knob 7 still remains in its operated state, the unlocking action on the cartridge chamber cover 6 is not performed until detection of the fact that the operation on the operation knob 7 is temporarily cancelled. By this arrangement, the action of bringing the camera back to its standby state can be canceled at once, so that the action of bringing back to the standby state does not have to be repeated until the electric energy of the power supply exhausts even in a case where the operation knob 7 is caused to become immovable by some reason.

While the invention is applied to a camera in the case of the embodiment disclosed, the invention is not limited to cameras but is applicable to any apparatus that is arranged to use a film cartridge.

In the case of the embodiment, the shaft 13 of the planet gear 12 is arranged to act as a cartridge chamber cover unlocking member to cause the driving lever 3 to swing from its position where it is brought into the locus of revolution of the planet gear 12 with the operation knob 7 operated. However, the invention is not limited to such an arrangement. The unlocking action may be arranged to be carried out by means of a planetary lever or the like. Such a modification is possible even in a case where the revolution of the planet gear is arranged to be made on one side which differs 180 degrees from the revolving side in the embodiment disclosed above.

As described above, when a cartridge chamber cover opening knob, i.e., the operation knob 7, is not operated, no limitation is imposed on the direction of rotating the film winding spool of the film cartridge. Under this condition, the data of a data disk can be read by rotating the film winding spool in the direction of film rewinding before performing a thrust driving action on the film. Besides, in a case where the camera is loaded with a halfway-used film cartridge, the cartridge chamber cover opening-and-closing device according to the invention permits the camera to temporarily rewind the film upon detection of an unexposed frame, and after that, to set the unexposed frame accurately at an aperture (exposure) position.

What is claimed is:

1. A device for opening and closing a cover of a film cartridge chamber, comprising:

a gear member having a gear part arranged to rotate for feeding and rewinding a film by engaging a supply spool of a film cartridge;

a revolving member arranged to engage said gear part and to be caused to revolve by rotation of said gear member;

an opening operation member provided for opening the cover; and a locking means arranged to lock the cover in a closed state or to unlock the cover, wherein said locking means moves from outside of a revolving travel locus of said revolving member to inside of the revolving travel locus of said revolving member in association with an operation of said opening operation member, and said locking means is driven by a revolving motion of said revolving member to unlock the cover.

2. A device according to claim 1, further comprising a detection switch for detecting an operation position, for opening the cover, of said opening operation member, and a motor for driving and causing said gear part to rotate, wherein said motor causes said gear part to rotate when said opening operation member has been detected by said detection switch to be at the operation position.

3. A device according to claim 2, wherein said motor is arranged to cause said gear part to rotate in a direction of feeding the film.

4. A device according to claim 1, further comprising a first detection switch arranged to detect whether or not said locking means is at a locking position, a second detection switch arranged to detect presence or absence of the film, and a motor provided for driving said gear part to rotate, wherein said motor drives said gear part to rotate in a direction of rewinding the film when said locking means has been detected by said first detection switch to be at a locking position and the film has been detected by said second detection switch to be absent.

5. A device according to claim 1, further comprising an urging member arranged to urge said lock member to move toward a locking position thereof.

6. A device according to claim 1, further comprising first and second restricting members arranged to define a movable range of said revolving member, and said revolving member is allowed to move within the movable range.

7. A device according to claim 1, wherein said device is a camera.

8. A device according to claim 3, wherein, while the cover is in an unlocked state from the closed state, said gear part does not engage the supply spool to feed the film.

* * * * *

UNITED STATES PATENT AND TRADEMARK OFFICE
CERTIFICATE OF CORRECTION

PATENT NO. : 6,386,769 B1
DATED : May 14, 2002
INVENTOR(S) : Masakazu Taku

It is certified that error appears in the above-identified patent and that said Letters Patent is hereby corrected as shown below:

<u>Column 8,</u>
Line 16, delete "if" and insert -- 1f --.
Line 31, delete "fork gear then" and insert -- fork gear 11 then --.

Signed and Sealed this

First Day of October, 2002

*Attest:*

JAMES E. ROGAN
*Attesting Officer*   *Director of the United States Patent and Trademark Office*